United States Patent
Jung et al.

(10) Patent No.: US 10,464,802 B2
(45) Date of Patent: Nov. 5, 2019

(54) COLD WATER GENERATING APPARATUS AND WATER PURIFIER HAVING THE SAME

(71) Applicant: LG ELECTRONICS INC., Seoul (KR)

(72) Inventors: Jisun Jung, Seoul (KR); Jaegeun Lee, Seoul (KR); Jintae Kim, Seoul (KR); Jinpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 15/705,480

(22) Filed: Sep. 15, 2017

(65) Prior Publication Data
US 2018/0099854 A1    Apr. 12, 2018

(30) Foreign Application Priority Data
Oct. 11, 2016   (KR) .......................... 10-2016-0131474

(51) Int. Cl.
*F25B 21/02*      (2006.01)
*F25B 21/04*      (2006.01)
(Continued)

(52) U.S. Cl.
CPC .......... *B67D 3/0009* (2013.01); *B67D 3/0022* (2013.01); *C02F 9/005* (2013.01);
(Continued)

(58) Field of Classification Search
CPC .......... F25B 21/00; F25B 21/02; F25B 21/04; F25B 2321/02; F25B 2321/023;
(Continued)

(56) References Cited

U.S. PATENT DOCUMENTS 4,829,771 A * 5/1989 Koslow ................ B67D 1/0869
62/3.64
5,367,879 A * 11/1994 Doke ...................... F25B 21/02
62/139
(Continued)

FOREIGN PATENT DOCUMENTS

CN   1155408    7/1997
CN   102380248  3/2012
(Continued)

OTHER PUBLICATIONS

Australian Office Action dated Nov. 27, 2018 issued in AU Application No. 2017245321.
(Continued)

*Primary Examiner* — Elizabeth J Martin
*Assistant Examiner* — Daniel C Comings
(74) *Attorney, Agent, or Firm* — KED & Associates, LLP

(57) ABSTRACT

A cold water generating apparatus according to the present disclosure includes a tank having an inlet port and an outlet port, a cooling module coupled to the tank to cool purified water introduced into the tank through the inlet port, and an internal passage unit formed inside the tank to guide the purified water from the inlet port to the outlet port, wherein a part of the purified water is phase-changed into ice within the tank by the cooling module, and another part of the purified water flows along the internal passage unit to be brought into contact with the ice so as to be discharged through the outlet port.

20 Claims, 5 Drawing Sheets

(51) Int. Cl.
*B67D 3/00* (2006.01)
*C02F 9/00* (2006.01)
*C02F 1/00* (2006.01)
*C02F 1/28* (2006.01)
*C02F 1/44* (2006.01)
*C02F 101/00* (2006.01)
*C02F 101/10* (2006.01)

(52) U.S. Cl.
CPC ............. *F25B 21/04* (2013.01); *C02F 1/001* (2013.01); *C02F 1/003* (2013.01); *C02F 1/283* (2013.01); *C02F 1/441* (2013.01); *C02F 1/444* (2013.01); *C02F 2101/006* (2013.01); *C02F 2101/10* (2013.01); *C02F 2303/02* (2013.01); *C02F 2307/10* (2013.01); *F25B 21/02* (2013.01); *F25B 2321/023* (2013.01); *F25B 2321/025* (2013.01); *F25B 2321/0251* (2013.01)

(58) Field of Classification Search
CPC ........ F25B 2321/025; F25B 2321/0251; C02F 2307/10; B67D 3/0009; B67D 3/0022
USPC ........... 62/3.6, 3.63, 3.64, 457.1, 457.4, 389
See application file for complete search history.

(56) References Cited

U.S. PATENT DOCUMENTS

| | | | | |
|---|---|---|---|---|
| 5,493,864 | A | * | 2/1996 | Pomerene ............ B67D 3/0009 165/146 |
| 6,119,464 | A | * | 9/2000 | Nakayama ........... B67D 1/0869 62/139 |
| 2005/0139552 | A1 | * | 6/2005 | Forsberg .................. E03B 3/28 62/635 |
| 2012/0036883 | A1 | | 2/2012 | Jeong et al. |
| 2013/0104586 | A1 | * | 5/2013 | Krause .................... B67D 1/07 62/275 |
| 2016/0054043 | A1 | * | 2/2016 | Broadbent ................ F25C 1/25 62/66 |

FOREIGN PATENT DOCUMENTS

| | | |
|---|---|---|
| CN | 102395416 | 3/2012 |
| KR | 10-2014-0098017 | 8/2014 |
| KR | 10-2015-0124222 | 11/2015 |

OTHER PUBLICATIONS

Chinese Office Action (with English translation) dated Aug. 5, 2019 issued in CN Application No. 201710822529.5.

* cited by examiner

COLD WATER GENERATING APPARATUS AND WATER PURIFIER HAVING THE SAME

CROSS-REFERENCE TO RELATED APPLICATION(S)

This application claims priority under 35 U.S.C. § 119 to Korean Application No. 10-2016-0131474, filed on Oct. 11, 2016, whose entire disclosure is hereby incorporated by reference.

BACKGROUND

1. Field

The present disclosure relates to an apparatus for generating cold water (i.e., a cold water generating apparatus) for cooling drinkable purified water, and a water purifier having the same.

2. Background

A water purifier may be a device that filters water by physical and/or chemical methods to remove impurities and then supplies the purified water to a user. Water purifiers may be categorized, for example, as a natural filtration type, a direct filtration type, an ion exchange water type, a distillation type, a reverse osmosis type, etc. according to an employed purification method.

The water purifiers may also be categorized as one of a storage water purifier or a direct-type water purifier. In the storage water purifier, water is purified through a filter and stored in a water storage tank, and the stored water from the storage tank may then be heated or cooled upon discharge from the tank and provided to a user. In the direct-type water purifier, water is purified through a filter and heated or cooled when provided to a user without storing the purified water in a water storage tank. Thus, the direct-type water purifier does not store a relatively large amount of the purified water as compared with the storage type water purifier. Accordingly, the direct-type water purifier can typically be relatively lighter and smaller, and the purified water in the direct-type water purifier may be less likely to become contaminated during storage. The direct-type water purifier has a further effect of reducing power consumption associated with continuously heating or cooling the relatively large amount of water contained in the water storage tank at a desired temperature.

However, the direct-type water purifier should heat or cool the purified water to desired temperatures within a relatively short time after starting to discharge water, while also continuing to heat or cool the purified water at the desired temperatures to discharge a relatively continuous supply of the cold water or the hot water. To this end, the direct-type water purifier may include a tank or a passage which receives a predetermined amount of the purified water that is heated or cooled through a heat-exchange. In order to increase a continuous flow rate of the cooled purified water, a size of the tank or the passage may be increased, but increasing the tank or the passage would also increase the overall volume and weight of the water purifier.

A direct-type water purifier may include a cooling or heating module employing a thermoelectric element for quickly generating cold water and hot water. The thermoelectric element may absorb or generate heat using electric energy. The thermoelectric element provides a relatively high response speed and while generating relatively less noise and vibration in comparison to other water heating and cooling components. Furthermore, the thermoelectric element tends to be relatively light in weight and small in size. However, the thermoelectric element generally tends to have high power consumption due to relatively low thermal efficiency.

BRIEF DESCRIPTION OF THE DRAWINGS

Embodiments will be described in detail with reference to the following drawings in which like reference numerals refer to like elements and wherein.

DETAILED DESCRIPTION

Description will now be given in detail of a water purifier and a cold water generating apparatus according to exemplary embodiments disclosed herein, with reference to the accompanying drawings. In this specification, a "water purifier" may generally refer to a device to generate clean water (hereinafter, 'purified water') by filtering foreign materials from water received from a water supply, such as a tap, through a filter assembly. In addition, the water purifier may heat or cool the purified water and provide the hot or cold purified water in response to a user input. The water purifier may be an independent device or may be a component included in another home appliance, such as a refrigerator.

In this specification, the cold water generating apparatus may function to cool the purified water filtered by the water purifier to form "cold water." The cold water generating apparatus may be may be a separate device, a part of the water purifier, or a part of a home appliance that is separate from the water purifier, such as a refrigerator. For example, the water purifier may generate purified water though a filter assembly and supply the purified water to the refrigerator. The purified water received at the refrigerator may then be cooled through the cold water generating apparatus that is coupled to or included in the refrigerator, and the cold water is supplied to a user through a water supply device (e.g., dispenser).

Figure 1:
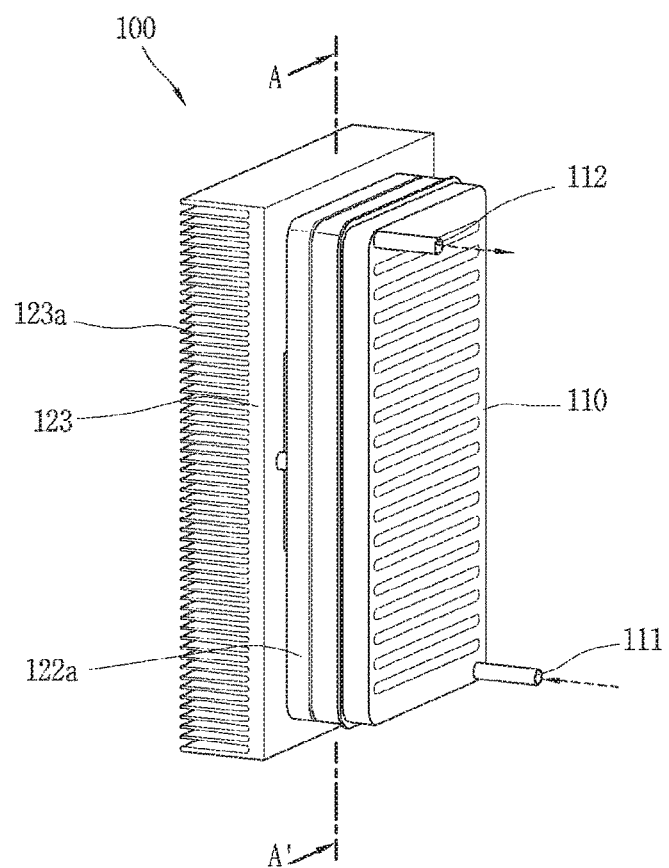
FIG. 1 is a perspective view of a cold water generating apparatus according to the present disclosure.
Figure 2:
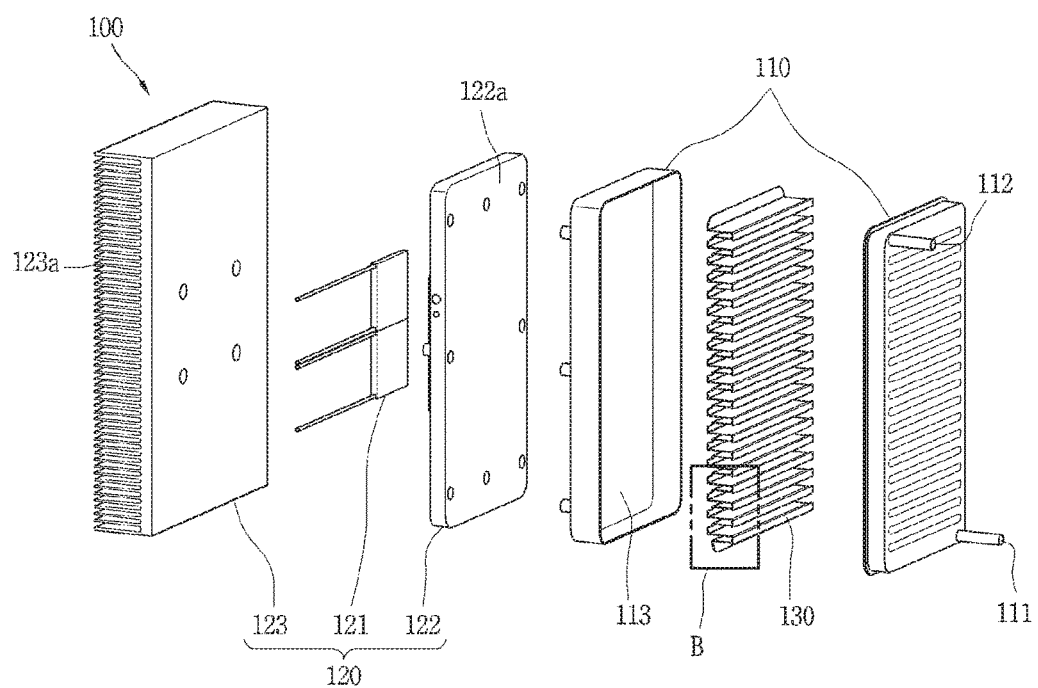
FIG. 2 is an exploded perspective view of the cold water generating apparatus illustrated in FIG. 1.

FIG. 1 is a perspective view of a cold water generating apparatus 100 according to the present disclosure, and FIG. 2 is an exploded perspective view of the cold water generating apparatus 100 illustrated in FIG. 1. As illustrated in FIGS. 1 and 2, the cold water generating apparatus 100 according to the present disclosure includes a tank 110, a cooling module 120, and an internal passage unit 130.

The tank 110 provides an internal space through which purified water flows and is cooled to generate cold water. For this purpose, the tank 110 is provided with an inlet port 111 and an outlet port 112. As illustrated in FIGS. 1 and 2, the tank 110 may have a rectangular shape with a relatively large surface area in one direction. Purified water is introduced into the tank 110 through the inlet port 111, and cold water is discharged through the outlet port 112 after the purified water is cooled within the tank 110. In the embodiment illustrated in FIGS. 1 and 2, that the inlet port 111 and the outlet port 112 are located on one relatively large planer surface of the tank 110 (e.g., the external exposed front surface of the tank 110 that is opposite to an internal surface facing the cooling module 120).

The cooling module 120 coupled with the tank 110 may cool the purified water in the tank 110 through a heat-exchange with the tank 110. The cooling module 120 may be provided with a thermoelectric element 121 to be described later in order to cool the purified water within the tank 110. A detailed structure and function of the cooling module 120 provided with the thermoelectric element 121 will be described later in detail. However, the cold water generating apparatus 100 according to the present disclosure may employ various cooling methods in addition to or alternatively to using the thermoelectric element 121.

The internal passage unit 130 is positioned within the tank 110 and guides the purified water from the inlet port 111 to the outlet port 112. In the cold water generating apparatus 100 according to the present disclosure, when purified water passing through the tank 110 flows out through the outlet port 112, the purified water is cooled to a preset temperature. Therefore, the internal passage unit 130 may be configured such that the purified water remains on the tank 110 for a sufficient time for the heat-exchange to achieve the desired temperature.

Meanwhile, the cold water generating apparatus 100 according to the present disclosure that includes the tank 110, the cooling module 120, and the internal passage unit 130 described above may be configured to freeze a part of purified water into ice. That is, the cooling module 120 may be controlled to cool a part of purified water introduced into the tank 110 through the inlet port 111 down to a temperature lower than a target temperature for cold water and cause a phase change of a portion of the purified water in the tank 110 into ice 10 (see, FIG. 3). The phase-changed ice 10 may remain within the tank 110. Another part of the purified water introduced into the tank 110 through the inlet port 111 is brought into contact with the ice 10 along the internal passage unit 130 and exchanges heat with the ice 10 to cool the purified water. The cooled purified water then flows into the outlet port 112. In this way, when cooling the purified water, the cold water generating apparatus 100 according to the present disclosure may freeze a portion of the purified water within the tank 110 into the ice 10, and the ice 10 may then help cool the remaining, non-frozen portion of the purified water, thereby enhancing the cooling efficiency of the cold water generating apparatus 100.

In detail, rather than cooling purified water down to a target temperature, discharging the cooled purified water, and then having to again cool newly-introduced purified water, the inside of the tank 110 of the present disclosure is continuously maintained in a low temperature state due to the ice 10, and any newly introduced purified water directly exchanges heat with the ice 10 so as to be rapidly cooled. In other words, the ice 10 functions as a thermal buffer to maintain a relatively cold temperature within the tank 110 and to absorb heat from the liquid purified water. This configuration may result in reducing a recovery time for cooling newly introduced purified water to a target temperature value within the tank 110 after a predetermined amount of cold water is discharged. According to this aspect of the cold water generating apparatus 100, a length of the internal passage unit 130 and/or a volume of the tank 110 can be reduced such that the cold water generating apparatus 100 can be reduced in size while still providing similar cooling performance as other, larger water cooling device that do not generate the ice 10.

Figure 3:
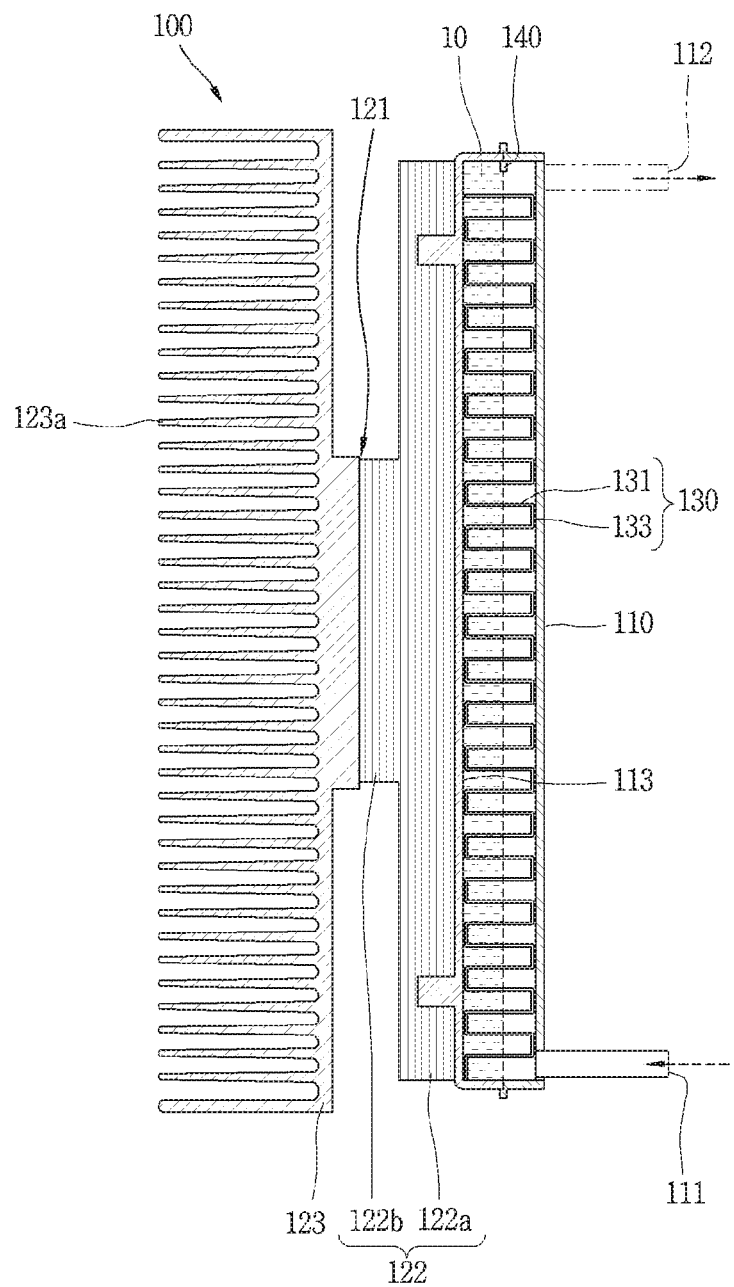
FIG. 3 is a sectional view taken along the line AA' of FIG. 1.

FIG. 3 is a sectional view taken along the line AA' of FIG. 1. Hereinafter, a description will be given of a detailed structure of the cold water generating apparatus 100 according to the present disclosure to generate the ice 10, with reference to FIGS. 1 to 3. First, the tank 110 may be provided with a cooling sidewall 113 having one relatively large surface facing the cooling module 120. As illustrated in FIGS. 2 and 3, the cooling module 120 may be coupled to and/or contact an outside side surface of the cooling sidewall 113. For example, the cooling sidewall 113 may include one or more protrusions that extend from the outer side surface, and an adjacent facing surfacing of the cooling module 120 may include corresponding recesses to receive the protrusions.

With the connecting structure, the cooling sidewall 113 directly exchanges heat with the cooling module 120, and purified water within the tank 110 is cooled, starting from a portion of the purified water contacting an inner surface of the cooling sidewall 113. Accordingly, a part of the purified water inside the tank 110 is frozen into ice 10 in a plate shape, which is generated from an inner surface of the cooling sidewall 113. Another part of the purified water flows through a remaining space of the tank 110 to a side of the ice 10 (e.g., a portion of the inside of the tank 110 positioned away from the inner surface of the cooling sidewall 113). While flowing through the space, the other part of the purified water performs the heat-exchange with the ice 10 and, thus, is discharged as cold water through the outlet port 112.

This structure facilitates the construction of the internal passage unit 130, in which the purified water exchanges heat for an extended time with the plate-like ice 10 generated along the one inside surface of the tank 110, and allows for control of a size (or thickness) of the ice 10. In order to control the size (or thickness) of the ice 10 generated on the inner surface of the cooling sidewall 113, the cold water generating apparatus 100 according to the present disclosure may further include a temperature sensor 140.

The temperature sensor 140, as illustrated in FIG. 3, may be positioned to be spaced apart from the inner surface of the cooling sidewall 113 by a preset interval. In one implementation, the preset interval may correspond to a thickness of the ice 10 to be maintained (e.g., a desired thickness for the ice 10). Specifically, the thickness of the ice 10 may gradually increase as some of the purified water changes phase into the ice 10 and accumulates on the inner surface of the cooling sidewall 113. While the temperature sensor 140 contacts the liquid purified water, a temperature detected by the temperature sensor 140 generally remains at or above a freezing point (e.g., zero degree Celsius) because the liquid purified water functions as a thermal buffer. When a width of the ice 10 becomes larger than the preset interval such that the ice 10 surrounds or otherwise contacts the temperature sensor 140, a temperature detected by the temperature sensor 140 may drop relatively rapidly below the freezing point. The temperature sensor 140 may detect the temperature change due to the phase change and use this detected temperature change to determine when the ice 10 has a thickness corresponding to the preset interval and contacts the temperature sensor. For example, a rapid temperature drop detected by the temperature sensor 140 may generally indicate that the ice 10 has grown to the preset interval, while a temperature increase detected by the temperature sensor 140 may generally indicate that the ice 10 has shrunk to be thinner than the preset interval.

Since the thickness of the ice 10 can be detected and controlled in the cold water generating apparatus 100 according to the present disclosure (as described in greater detail below), an amount of the ice 10 that is generated within the tank 110 can be set and maintained. Supplying a controlled amount of the ice 10 may enable the cold water generating apparatus 100 to continuously discharge cold water since the ice 10 may quickly cool the purified water passing through the tank 110.

Further, the temperature sensor 140 may serve to detect the thickness of the ice 10 so that the cold water generating apparatus 100 may maintain a predetermined amount (or desired thickness) of the ice 10. For example, the cold water generating apparatus 100 may maintain a sufficiently large amount of the ice 10 such that the purified water can be rapidly cooled while passing in the tank 110 between the inlet port 111 to the outlet port 112. For example, the ice 10 may be maintained at a sufficient thickness such that the purified water contacts the ice through a desired portion of the passage in the tank 110. At the same time, the cold water generating apparatus 100 may prevent the generation of an excessive amount (or thickness) of the ice 10 that may undesirably reduce or even block the flow of the purified water through the tank 110.

For example, when the ice 10 has grown to a thickness corresponding to the preset interval from the cooling sidewall 113 such that the ice 10 can be detected by the temperature sensor 140, the cooling module 120 may be controlled to operate at a warmer temperature or to be powered off. Accordingly, the ice 10 does continue to grow away from the cooling sidewall 113, and the thickness of the ice 10 may be gradually reduced due to a phase change when cooling new purified water introduced through the inlet port 111.

Although a single temperature sensor 140 is depicted in FIG. 3, multiple temperature sensors 140 may be provided in the tank 110 in certain implementations. For example, temperature sensors 140 may be installed at different positions within the tank 110 to sense temperatures at a plurality of positions. Accordingly, when one of the temperature sensors 140 fails and does not accurately detect a temperature drop in the ice 10 due to a phase change, the thickness of the ice 10 can be controlled using the readings from one or more other temperatures sensors 140. In another example, the temperature sensors 140 may detect when relatively thicker section of the ice 10 is formed in a portion of the tank 110 or when a portion of the ice 10 breaks away from a portion of the tank 110 and travels to another portion of the tank 110. This may result in ensuring a more reliable operation of the cold water generating apparatus 100 according to the present disclosure.

In addition, the plurality of temperature sensors 140 may be arranged to have different respective intervals from the cooling sidewall 113. With this arrangement, the thickness of the ice 10 within the tank 110 can be controlled more precisely by setting an upper limit (or thickness) value and a lower limit (or thickness) value. For example, the cooling module 120 may be activated while the ice 10 is thinner than an upper limit value (e.g., a first subset of the temperature sensors 140 that is spaced relatively further from the cooling sidewall 113 does not contact the ice 10), and purified water may be introduced into the tank 110 to be cooled when the ice 10 is wider than an lower upper limit value (e.g., a second subset of the temperature sensors 140 that is spaced relatively closer to the cooling sidewall 113 contacts the ice 10).

One or more of the temperature sensors 140 may be installed additionally or alternatively on a cooling block 122 or a heat dissipation block 123 to be explained later. That is, a temperature value can be measured at a position other than the inside of the tank 110, and this other temperature measurement may be used to control the module to provide an accurate cold water temperature and a desired outputted flow rate of the cold water.

Hereinafter, a description will be given of a configuration that accomplishes an effective heat exchange through a structure including the inlet port 111, the outlet port 112, and the internal passage unit 130. As illustrated in FIGS. 1 to 3, the cooling by the cooling module 120 may be performed through the cooling sidewall 113 formed on a side surface of the tank 110. Therefore, when the inlet port 111 and the outlet port 112 are arranged vertically, the heat exchange may sufficiently be performed between purified water and the ice 10 formed on the inner surface of the cooling sidewall 113.

In the cold water generating apparatus 100 according to one embodiment, the outlet port 112 provided in the tank 110 may be provided higher than the inlet port 111. When the outlet port 112 is provided above the inlet port 111, the purified water introduced into the inlet port 111 is filled in the tank 110, starting from a lower portion of the tank, due to gravity, and then flows toward the outlet port 112. This configuration may allow the purified water to be more evenly distributed in the tank 110 and to stay in the tank 100 for a relatively longer time, which may result in a more effective heat-exchange between the purified water and the ice 10, as compared to a different configuration in which the inlet port 111 is provided above the outlet port 112.

In the cold water generating apparatus 100 according to the present disclosure, the internal passage unit 130 plays a role of promoting the heat exchange between the purified water and the ice 10 in the tank 110. To this end, the internal passage unit 130 may include a plurality of partition walls (or horizontal walls) 131 and a plurality of penetration portions (or openings) 132.

Figure 4:
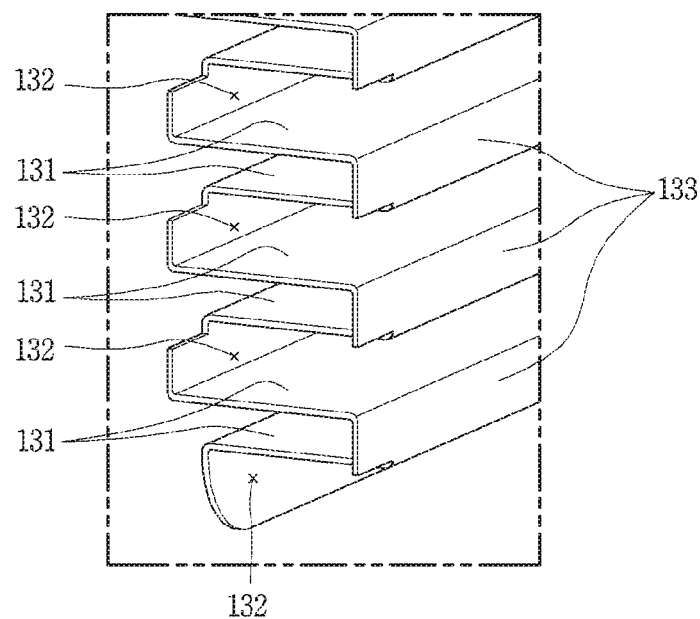
FIG. 4 is an enlarged view of an area B illustrated in FIG. 2.

FIG. 4 is an enlarged view of an area B of the internal passage unit 130 illustrated in FIG. 2. As illustrated in FIGS. 2 to 4, the plurality of partition walls 131 extend substantially parallel in directions (or planes) that intersect a line between the inlet port 111 and the outlet port 112, and the partition walls 131 are spaced apart from each other at preset intervals between the inlet port 111 and the outlet port 112. In this embodiment, the plurality of partition walls 131 may extend in a right-left (or substantially horizontal) direction perpendicularly intersecting with an up-and-down (or substantially vertical) direction between the inlet port 111 and the outlet port 112.

In addition, each partition wall 131 may include a penetrating portion 132 through which purified water flows. In this embodiment, as illustrated in FIGS. 2 and 4, the penetrating portion 132 may be a space in the partition wall 131 which is recessed from a side surface at a lateral end portion of the partition wall 131. When the internal passage unit 130 is located within the tank 110, the penetration portion 132 may be a space by which the purified water flows through each of the partition walls 131 when flowing along the inner surface of the tank 110. However, the penetrating portion 132, although shown as being inwardly recessed at the end portion of the partition wall 131 in FIG. 4, may be a space formed at another point of the partition wall 131, such as a location positioned away from an end portion of the partition wall 131.

The penetrating portions 132 may be positioned in an alternating manner in the plurality of partition walls 131. For example, the penetrating portions 132 may be positioned at respective opposite lateral ends of adjacent pairs of the partition walls 131. This configuration allows the purified water to flow along a continuous extended path formed in a space between the partition walls 131. In this manner, the internal passage unit 130 of the cold water generating apparatus 100 according to one embodiment can be provided with the partition walls 131 such that the purified water can flow in a zigzag path within the tank 110, so as to maximize heat exchange time and area to thereby enhance the performance and efficiency of generating the cold water while also enabling the apparatus to remain relatively small.

In this configuration of the internal passage unit 130 in which the partition walls 131 and the penetrating portions 132 combine to form the zigzag path through the tank 110, the tank 110 may have a structure in which the inlet port 111 is located lower than the outlet port 112 to enable a more effective heat-exchange in comparison to a structure in which the outlet port 112 is located lower than the inlet port 111. In detail, when the inlet port 111 is positioned relatively higher than the output port 112, the purified water drops with relatively low resistance due to gravity to flow down through the penetrating portion 132. On the other hand, when the purified water is introduced into the lower portion of the tank 110 through a lower positioned inlet port 111, the purified water flows upwardly against gravity in a zigzag manner through the penetrating portions 132. Also, the purified water is less likely to flow into a space between adjacent two partition walls 131 through the penetrating portion 132 without fully filling the space between the adjacent partition walls 131 while flowing upward along the partition walls 131. By virtue of this upward zigzag flow through the penetrating portions 132 of the partition walls 131, the purified water flowing inside the tank 110 can pass through a relatively longer path for a greater amount of time for an improved heat exchange with the ice 10 within the tank 110.

Meanwhile, the internal passage unit 130 of the present disclosure may further include a plurality of connection walls (or vertical walls) 133 coupled to the plurality of partition walls 131. The plurality of connection walls 133 may be provided to connect the plurality of partition walls 131 together. In particular, the plurality of partition walls 131 and connection walls 133, as illustrated in FIGS. 2 and 3, may be connected in a bent manner to form an integral form. That is, in this embodiment, the internal passage unit 130 may be integrally formed in a manner that the partition walls 131 and the connection walls 133, which extend at respective different angles, are provided in an alternating manner. For instance, adjacent pairs of the connection walls 133 may be provided at alternate side edges of a common partition wall 131 (e.g., a first edge of the partition wall 131, that is adjacent to the cooling sidewall 113, may be coupled to a first connection wall 133 that extends from first edge in a first vertical direction, and a second edge of the partition wall 131, that is opposite to the cooling sidewall 113, may be coupled to a second connection wall 133 that extends from second edge in a second vertical direction). Thus, the internal passage unit 130 can be easily fabricated from one plate in an accordion-like structure to improve a durability of the internal passage unit 130.

Meanwhile, the cooling module 120 of the cold water generating apparatus 100 according to the embodiment of the present disclosure may employ a cooling method using the thermoelectric element 121, as described above. Referring to FIG. 3, the cooling module 120 may include a thermoelectric element (or cooling element) 121, a cooling block 122, and a heat dissipation block 123.

The thermoelectric element 121 is a device that performs cooling or heating by using a Peltier effect in which heat generation or heat absorption occurs at a connected point of conducting wires made of different materials when a potential difference is caused in a closed circuit. The thermoelectric element 121 employed in this embodiment may be fabricated in a form of a thin film. Heat absorption is generated at one side of the thermoelectric element 121, and heat generation is generated at another side thereof when an electric signal is inputted to the thermoelectric element 121. In the example shown in FIG. 3, a right side of the thermoelectric element 121 (facing the tank 110) may be a side where temperature is lowered due to the heat absorption, and a left side thereof (opposite to the tank 110) may be a side where temperature rises due to the heat generation.

In other implementations, the thermoelectric element 121 may be omitted, and the cooling block 122 may be cooled through a different cooling technology, such as a refrigeration cycle in which a refrigerant undergoes heat exchanges and phase changes to remove heat from a space. The refrigeration cycle may typically include, for example, a compressor, a condenser, a thermal expansion valve, and an evaporator.

The cooling block 122 may be mounted on one side of the thermoelectric element 121. The cooling block 122 is cooled by the heat absorption occurred at the one side of the thermoelectric element 121 so as to cool the tank 110. In detail, as illustrated in FIG. 3, the cooling block 122 may include a first block 122a and a second block 122b. The first block 122a may cover the exterior side surface of the cooling sidewall 113 forming one surface of the tank 110, and the second block 122b may cover one side of the thermoelectric element 121 facing the cooling sidewall 113. The cooling block 122 may thus be thermally and physically connected to the cooling sidewall 113 of the tank 110 and the thermoelectric element 121, such that heat is exchanged between the tank and the thermoelectric element 121.

Planer sizes of the first block 122a and the second block 122b may be set to match, respectively, the planar sizes of contacting surfaces of the cooling sidewall 113 and the thermoelectric element 121. This structure may allow heat to be absorbed uniformly from the cooling sidewall 113, such that the inner surface of the cooling sidewall 113 is cooled more uniformly. Accordingly, the ice 10 generated on the inner surface of the cooling sidewall 113 may have a more constant thickness.

The heat dissipation block 123 may be mounted on the other side of the thermoelectric element 121 (opposite the cooling sidewall 113 of the tank 110). When the one side of the thermoelectric element 121 is operated to absorb heat to cool the tank 110, the other side thereof dispenses the absorbed heat, and the heat dissipation block 123 is provided to perform the heat dissipation. The heat dissipation block 123 may include a plurality of heat dissipation fins 123a protruding from an exterior side (right in FIG. 3) that is opposite the side of the heat dissipation block 123 which is coupled to the thermoelectric element 121. The structure including the heat dissipation fins 123a is a structure capable of increasing a contact area with air to help heat dissipation by a convective heat transfer. When the thermoelectric element 121 is not used and the cold water generating apparatus 100 uses a different cooling technology, such as a refrigeration cycle, the heat dissipation block 123 may be used to cool components where heat is generated (such as a compressor or a condenser).

The cold water generating apparatus 100 according to certain implementation described in the present disclosure may generate less noise and vibration by cooling purified water using the thermoelectric element 121 and the generated the ice 10 while reducing the size of the cooling module 120. Thus, the structure may reduce a size and a weight of the cold water generating apparatus 100.

Figure 5:
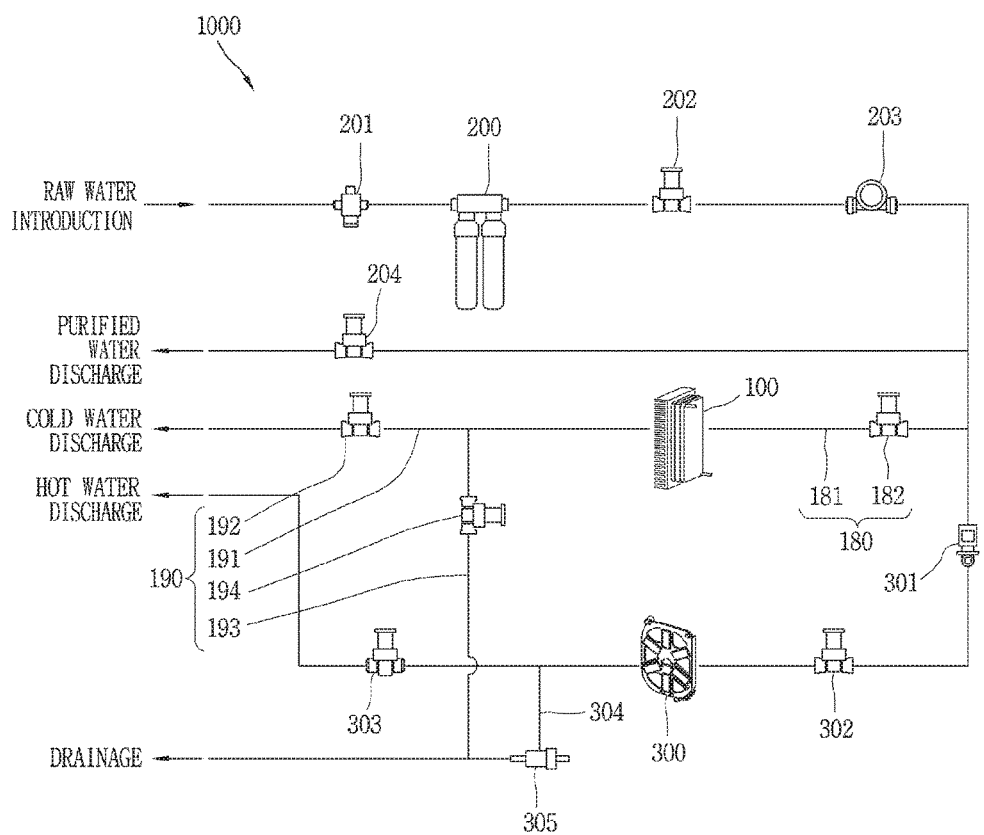
FIG. 5 is a conceptual view of a water purifier according to the present disclosure.

Hereinafter, a water purifier 1000 having the cold water generating apparatus 100 of the present disclosure will be described. FIG. 5 is a conceptual view of the water purifier 1000 according to certain embodiments of the present disclosure. The water purifier 1000 according to the present disclosure may include a filter unit (or filter) 200, a cold water introduction passage unit 180, the cold water generating apparatus 100, and a cold water discharge passage unit 190.

The filter unit 200 serves to generate the purified water by purifying raw water (e.g., water from a tap) to have certain desired purity or taste qualities for drinking water. The filter unit 200 is connected to a flow path into which the raw water is introduced. As illustrated in FIG. 5, a pressure reducing valve 201 may be provided at a front end of the filter unit 200, so that the raw water can be introduced into the filter unit 200 with suitable water pressure.

The filter unit 200 may include various types of filters, and may be connected to define flow paths through which the raw water can be introduced into each filter in a sequential manner. In one exemplarily filter configuration for purifying raw water, the raw water may first flows through a sediment filter that removes rust, sand or the like, and then passes through a pre-carbon filter that removes impurities such as chlorine and the like and odor. Then, the water may then be passed through a ultrafiltration (UF) membrane filter or a reverse osmosis filter to remove impurities such as bacteria, radioactive materials and the like. Afterwards, a post-carbon filter may be installed to remove gas and odor. By passing the raw water through at least some of those filters within the filter unit 200, the raw water can be purified to be suitable for human and pet consumption.

To output the purified water without heating or cooling (e.g., at room temperature), the purified water generated through the filter unit 200 may pass through a feed valve 202, a flow rate sensor 203, and the like, or may be supplied in the purified state according to the opening or closing of a discharge valve 204.

Alternatively, the water purifier 1000 according to certain embodiments may be configured to discharge the cold water by causing the purified water to flow into the cold water generating apparatus 100 through the cold water introduction passage unit 180 and then directing the cold water from the cold water generating apparatus 100 through the cold water discharge passage unit 190. For example, as described above, the cold water generating apparatus 100 generates the ice 10 inside the tank 110 using a part of the purified water, and then cools another part of the purified water using the ice 10.

More specifically, the cold water introduction passage unit 180 may include a cold water introduction passage 181 connected to the cold water generating apparatus 100 from the filter unit 200 and the like, and a cold water introduction valve 182 provided to open and close the cold water introduction passage 181. The cold water discharge passage unit 190 may include a cold water discharge passage 191 connected to an outside from the cold water generating apparatus 100, and a cold water discharge valve 192 provided to open or close the cold water discharge passage 191.

The process of phase-changing a part of purified water to the ice 10 in the tank 110 starts by opening the cold water introduction valve 182 while the cold water discharge valve 192 is closed to fill the tank 110 with the purified water. The cold water introduction valve 182 may be closed after the tank 110 is filled with the purified water. After a part of the purified water is cooled into the ice of a preset thickness within the tank 110, the cold water introduction valve 182 remains closed to be in a standby state. When a user starts a cold water discharge operation, the cold water introduction valve 182 and the cold water discharge valve 192 may be simultaneously opened so as to perform a direct-type water discharge operation in which new purified water is supplied to the tank 110 to be cooled by the ice 10 and the cold water is outputted from the tank 110.

When the purified water is cooled while both the cold water introduction valve 182 and the cold water discharge valve 192 are closed, the cold water generating apparatus 100 may be affected by pressure due to an expansion of the purified water during the phase-change from a liquid form into the ice 10. Accordingly, the tank 110 constituting the cold water generating apparatus 100 may be likely to be expanded or the internal passage unit 130 may be likely to be structurally deformed, and a structural damage or deterioration of heat exchange capability may result. In order to address such problems, the cold water discharge passage unit 190 of the water purifier 1000 according to the present disclosure may further include a drain passage 193 and a drain valve 194.

As illustrated in FIG. 5, the drain passage 193 may be branched out from the cold water discharge passage 191, and the drain valve 194 may be mounted to open and close the drain passage 193. The drain passage 193 is formed such that purified water can flow out due to a volume expansion when the ice 10 is generated in the tank 110 while the cold water introduction valve 182 and the cold water discharge valve 192 are both closed. Particularly, the drain passage 191 may be provided above the tank 110 so that the purified water in the tank 110 does not generally flow out of the tank 110, and only an amount of purified water corresponding to the volume expansion of the ice 10 is discharged to outside. Therefore, the drain passage 193 and the drain valve 194 provided in the present disclosure may prevent the structural deformation and damage of the internal passage unit 130 or the tank 110 due to the expansion caused by the phase change in the cooled purified water.

Meanwhile, the water purifier 1000 according to the present disclosure, as illustrated in FIG. 5, may further include a hot water generating module (or heater) 300. In other words, the purified water generated by the filter unit 200 may be supplied to be cooled into cold water through the cold water generating apparatus 100 described above, or supplied to the hot water generating module 300 to be heated into hot water.

The purified water in the hot water generating module 300 may be heated to generate hot water relatively quickly in a small space by, for example, induction heating (IH). A flow rate control valve 301 for controlling a flow rate of hot water may be installed between the hot water generating module 300 and the filter unit 200. Similar to the configuration of discharging cold water, a hot water introduction valve 302 and a hot water discharge valve 303 may be provided to adjust an amount of water to be introduced to the hot water generating module 300 and an amount of the hot water to be discharged from the hot water generating module 300. In addition, the hot water generating module 300 may include a steam discharge passage 304 for discharging steam that may be generated during a process of heating the purified water. A safety valve 305 may be installed in the steam discharge passage 304 to discharge the steam safely.

When the water purifier 1000 according to the present disclosure is configured to supply both cold water and hot water, the drain passage 193 for generating the ice 10 and the steam discharge passage 304 for generating hot water may be joined with each other. That is, as illustrated in FIG. 5, the drainage passage 193 branched out from the cold water discharge passage 191 and the steam discharge passage 304 having the safety valve 305 may be finally joined to each other so as to output excess hot or cold water outside the water purifier 1000 through one outlet port. According to this structure, since the hot and cold water discharge passages are shared, the water purifier 1000 can be protected while generating cold water and/or hot water, while an efficient spatial arrangement and an economical structure can be achieved.

The foregoing description is merely given of an embodiment for the cold water generating apparatus 100 and the water purifier 1000 having the cold water generating apparatus 100. However, the present disclosure is not limited to the embodiment, but, on the contrary, it will be understood by those of ordinary skill in the art that various changes in form and details may be made therein without departing from the spirit and scope of the disclosure as defined in the appended claims.

According to embodiments disclosed herein, an apparatus for generating cold water (i.e., a cold water generating apparatus) may covert a part of purified water in into ice and form cold water by heat-exchanging another part of the purified water with the ice. According to embodiments disclosed herein, a cold water generating apparatus discharges cold water by maximizing a heat-exchange between purified water and ice generated to cover one surface of a flow path such that the cold water can be generated through sufficient heat-exchange between the purified water and the ice.

According to embodiments disclosed herein, a water purifier may discharge purified water corresponding to a volume expanded during an ice generating step to prevent deformation of components due to the expansion resulting from a phase change of the purified water while a cold water generating apparatus operates to generate ice.

According to embodiments disclosed herein, a cold water generating apparatus may include a tank having an inlet port and an outlet port, a cooling module coupled to the tank to cool purified water introduced into the tank through the inlet port, and an internal passage unit formed inside the tank to guide the purified water from the inlet port to the outlet port, wherein a part of the purified water remains within the internal passage unit with being phase-changed into ice by the cooling module, and another part of the purified water is cooled due to a contact with the ice while passing through the internal passage unit and then discharged through the outlet port.

Also, the tank may further include a cooling sidewall brought into contact with the cooling module to cause a heat-exchange, and the ice may be formed to cover an inner surface of the cooling sidewall. The apparatus may further include a temperature sensor installed within the tank with being spaced apart from the inner surface of the cooling sidewall by a preset interval.

According to embodiments disclosed herein, a cold water generating apparatus may include a tank provided with an inlet port and an outlet port, a cooling module an inlet port and an outlet port, a cooling module coupled to the tank to cool purified water introduced into the tank through the inlet port, and an internal passage unit formed inside the tank to guide the purified water from the inlet port to the outlet port, wherein a part of the purified water remains within the internal passage unit with being phase-changed into ice by the cooling module, and another part of the purified water is cooled due to a contact with the ice while passing through the internal passage unit and then discharged through the outlet port. The tank may further include a cooling sidewall brought into contact with the cooling module to cause a heat-exchange, and the ice may be formed to cover an inner surface of the cooling sidewall. The outlet port may be arranged higher than the inlet port.

In addition, the internal passage unit may include a plurality of partition walls extending in a direction of intersecting with a direction from the inlet port toward the outlet port, and arranged toward the outlet port with being spaced apart from the inlet port by a preset interval, and penetrating portions formed through the plurality of partition walls in an alternating manner such that the purified water flows in a zigzag form within the tank. The internal passage unit may further include a plurality of connection walls connecting the plurality of partition walls together, and the partition walls and the connection walls may be integrally connected in a bent manner.

The cooling module may include a thermoelectric element that absorbs heat at one side thereof and generates heat at another side, and a cooling block interposed between the one side of the thermoelectric element and the tank, and cooled by the thermoelectric element to heat-exchange with the tank. In detail, the tank may further include a cooling sidewall brought into contact with the cooling module to perform a heat-exchange. The cooling block may include a first block covering the cooling sidewall, and a second block connected to the first block and covering the one side of the thermoelectric element. The cooling module may further include a heat dissipation block coupled to another side of the thermoelectric element and provided with heat dissipation fins.

According to embodiments disclosed herein, a water purifier may include a filter unit to purify raw water, a cold water introduction passage unit having a cold water introduction valve and connected in a manner that purified water generated through the filter unit is introduced therein, a cold water generating apparatus connected to the cold water introduction passage unit to allow an introduction of the purified water, and configured to generate cold water by cooling the introduced purified water, and a cold water discharge passage unit connected to the cold water generating apparatus such that the cold water is discharged therethrough, wherein the cold water generating apparatus generates ice by phase-changing a part of the introduced purified water, and cools another part of the introduced purified water to generate the cold water.

Specifically, the cold water discharge passage unit may include a cold water discharge passage having a cold water discharge valve, a drain passage communicating with the cold water discharge passage, and a drain valve mounted in the drain passage and opening and closing the drain passage when generating the ice.

The water purifier may further include a hot water module configured to generate hot water by heating the purified water generated through the filter unit, and provided with a steam discharge passage through which steam is discharged upon the generation of the hot water. The drain passage may be connected to be joined with the steam discharge passage.

According, a cold water generating apparatus according to the present disclosure can change a part of purified water introduced into a tank into ice and cool another part of the purified water through heat exchange with the ice, so as to enhance capability of generating cold water relative to a volume of the apparatus. In detail, rather than continuously cooling newly-introduced purified water, the inside of the tank is continuously maintained in a low temperature state due to the ice remaining within the tank. This configuration may result in fast cooling introduced purified water and also reducing a size of the apparatus. According to the present disclosure, ice in a plate-like shape can grow as one surface of the tank is cooled, which may facilitate a formation of an internal passage unit to enable a heat-exchange of purified water for an extended time and allow an easy control of a thickness of the ice.

The present disclosure may employ a temperature sensor for detecting a change in a thickness of ice formed on an inner surface of the tank. Accordingly, a preset amount of ice can be maintained and adjusted, which may result in a continuous discharge of cold water.

According to embodiments disclosed herein, cold water generating apparatus may include a passage formed from a lower side to an upper side such that purified water to be cooled can flow therealong (starting at the low side and passing upwards to the upper side). This configuration may increase a time or area that the purified water to be cooled is brought into contact with a cooling module or ice to be heat-exchanged with it, thereby improving efficiency of generating cold water.

Also, an internal passage unit according to the present disclosure can be provided with partition walls by which purified water can flows in a zigzag manner within a tank. This may maximize heat-exchange time and area, thereby enhancing cold water generating performance and efficiency. Also, a size-reduction of the apparatus can be implemented. In addition, the internal passage unit may be provided with connection walls integrally connected with the partition walls, which may facilitate a formation of the internal passage unit from one plate and secure durability. Meanwhile, the present disclosure can cool purified water using a thermoelectric element, thereby generating less noise or vibration and reducing weight and size of the apparatus.

According to embodiments disclosed herein, a water purifier can be provided with a drain passage and a drain valve for draining purified water by being open when a part of the purified water is phase-changed into ice by a cooling module, thereby preventing a structural damage of an internal passage unit or tank due to an expansion caused by the phase change. In addition, the water purifier can share a pipe in a manner that a steam discharge passage and a drain passage provided in a hot water generating module are joined with each other, thereby enhancing reliability upon an operation of generating hot or cold water and also achieving an efficient spatial arrangement and an economical structure.

According to embodiments disclosed herein, a cold water generating apparatus comprises a tank having an inlet port to receive water and an outlet port; a cooling block coupled to the tank to perform a heat exchange; and an internal passage formed inside the tank to guide water from the inlet port to the outlet port, wherein a portion of the water is phase-changed into ice within the internal passage by the heat exchange, another portion of the water is cooled by contact with the ice while passing through the internal passage to generate the cold water, and the cold water is discharged through the outlet port.

According to embodiments disclosed herein, the cold water generating apparatus is included in a water purifier, the water purifier comprising: a filter to purify the water supplied to the inlet port; a cold water introduction passage that has a cold water introduction valve and connects the filter to the inlet port; and a cold water discharge passage that is connected to the outlet port to receive the cold water is discharged therethrough.

According to embodiments disclosed herein, a cold water generating apparatus comprises a tank that receives water; and a cooling block coupled to the tank to perform a heat exchange; wherein the tank includes a sidewall having an outer surface contacting the cooling block for the heat-exchange and an inner surface, and wherein the heat exchange causes a portion of the water to be phase-changed into ice formed on the inner surface of the sidewall, and another portion of the water is cooled by contact with the ice while passing through the tank to generate the cold water.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cold water generating apparatus, comprising:
   a tank having an inlet port to receive water and an outlet port;
   a cooling block coupled to the tank to perform a heat exchange; and
   an internal passage formed inside the tank to guide water from the inlet port to the outlet port,
   wherein the tank further includes a sidewall having an outer surface contacting the cooling block for the heat-exchange and an inner surface contacting the internal passage,
   wherein a portion of the water is phase-changed into ice within the internal passage by the heat exchange, another portion of the water is cooled by contact with the ice while passing through the internal passage to generate the cold water, and the cold water is discharged through the outlet port,
   wherein the internal passage includes:
      a plurality of partition walls extending in a first direction intersecting a second direction between the inlet port and the outlet port, and spaced apart from each other by a preset interval; and
      penetrating openings formed respectively through alternating lateral ends of the plurality of partition walls such that the water flows in a zigzag path within the tank, and
   wherein the ice is formed in a plate shape on the inner surface of the sidewall and grows toward the internal passage.

2. The cold water generating apparatus of claim 1, further comprising a temperature sensor provided in the tank and spaced apart from the inner surface of the sidewall by a prescribed interval.

3. The cold water generating apparatus of claim 2, wherein the heat exchange is deactivated when a temperature measured by the temperature sensor is below a threshold.

4. The cold water generating apparatus of claim 1, further comprising a plurality of temperature sensors provided in the tank and spaced apart from the inner surface of the sidewall by respective prescribed intervals.

5. The cold water generating apparatus of claim 1, wherein the outlet port is provided on first portion of the tank, and the inlet port is provided on a second portion of the tank that is lower than the first portion.

6. The cold water generating apparatus of claim 1, wherein the internal passage further includes a plurality of connection walls to connect the plurality of partition walls, and
wherein the partition walls and the connection walls are integrally connected, and pairs of the connection walls extend in opposite directions from a common one of the partition walls.

7. The cold water generating apparatus of claim 1, further comprising:
a thermoelectric element that transfers heat from a first side of the thermoelectric element to second side of the thermoelectric element,
wherein the cooling block is interposed between the first side of the thermoelectric element and the tank, and is cooled by the thermoelectric element to provide the heat-exchange with the tank.

8. The cold water generating apparatus of claim 7, wherein the cooling block includes:
a first block contacting an exterior surface of the sidewall; and
a second block connected to the first block and contacting the first side of the thermoelectric element.

9. The cold water generating apparatus of claim 8, wherein an area of a surface of the first block contacting the sidewall corresponds to an area of the exterior surface of the sidewall, an area of a surface of the second block contacting the first side of the thermoelectric element correspond to an area of the first side of the thermoelectric element, and wherein the area of the surface of the first block is larger than the area of the surface of the second block.

10. The cold water generating apparatus of claim 7, further comprising a heat dissipation block coupled to the second side of the thermoelectric element, the heat dissipation block including a surface contacting the second side of the thermoelectric element and fins extending from another surface of the heat dissipation block.

11. The cold water generating apparatus of claim 1, wherein the cold water generating apparatus is included in a water purifier, the water purifier comprising:
a filter to purify the water supplied to the inlet port;
a cold water introduction passage that has a cold water introduction valve and connects the filter to the inlet port; and
a cold water discharge passage that is connected to the outlet port to receive the cold water is discharged therethrough.

12. The cold water generating apparatus of claim 11, wherein the cold water discharge passage includes:
a cold water discharge valve;
a drain passage communicating with the cold water discharge passage; and
a drain valve mounted in the drain passage to selective open or close the drain passage when the ice is generated.

13. The cold water generating apparatus of claim 12, further comprising:
a heater to generate hot water by heating purified water generated through the filter; and
a steam discharge passage coupled to the heater and through which steam generated by the heater is discharged,
wherein the drain passage and the steam discharge passage are connected to a common drainage.

14. The cold water generating apparatus of claim 1, wherein additional water is received in the tank through the inlet port after the cold water is discharged through the outlet port, the additional water is cooled by contact with the ice while passing through the internal passage to generate additional cold water, and the additional cold water is discharged through the outlet port.

15. A cold water generating apparatus, comprising:
a tank that receives water; and
a cooling block coupled to the tank to perform a heat exchange,
wherein the tank includes a sidewall having an outer surface contacting the cooling block for the heat-exchange and an inner surface;
an inlet port provided on the tank to receive the water;
an outlet port provided on the tank to discharge the cold water; and
a plurality of partition walls extending in a first direction intersecting a second direction between the inlet port and the outlet port, and
wherein the heat exchange causes a portion of the water to be phase-changed into ice formed in a plate shape on the inner surface of the sidewall, and another portion of the water is cooled by contact with the ice while passing through the tank to generate the cold water,
wherein penetrating openings formed respectively through alternating lateral ends of the plurality of partition walls such that the water flows in a zigzag path within the tank between the inlet port and outlet port, and
wherein the ice grows toward the plurality of partition walls and is formed throughout the zigzag path.

16. The cold water generating apparatus of claim 15, further comprising a sensor provided in the tank and spaced apart from the inner surface of the sidewall by a prescribed interval, wherein the heat exchange is deactivated when the sensor determines that a thickness of the ice corresponds to the prescribed interval.

17. The cold water generating apparatus of claim 16, further comprising:
a thermoelectric element that transfers heat from a first side of the thermoelectric element to second side of the thermoelectric element,
wherein the cooling block is interposed between the first side of the thermoelectric element and the outer surface of the sidewall, and deactivating the heat exchange includes deactivating the thermoelectric element.

18. The cold water generating apparatus of claim 15, wherein the cooling sidewall includes one or more protrusions that extend from the outer surface, and an adjacent facing surfacing of the cooling block include corresponding recesses to receive the one or more protrusions.

19. The cold water generating apparatus of claim 15, further comprising:
    a plurality of connection walls that extend in the second direction to connect the plurality of partition walls.

20. The cold water generating apparatus of claim 19, wherein a first set of the connection walls extend along the sidewall, and a second set of the connection walls extends another surface of the tank that is opposite to the sidewall.

\* \* \* \* \*